M. Morgan.
Horse Rake.

No. 3219. Reissued Dec. 1. 1868.

Adam R. Reese, agt.
By his attorney,
A. M. Smith
Witnesses.
H. N. Doubleday
Alex Mahon

UNITED STATES PATENT OFFICE.

ADAM R. REESE, OF PHILLIPSBURG, N. J., ASSIGNEE OF ANN MORGAN, ADMINISTRATRIX OF THE ESTATE OF MIRICK MORGAN, DECEASED.

IMPROVEMENT IN HORSE-RAKES.

Specification forming part of Letters Patent No. 21,268, dated August 24, 1858; reissue No. 3,219, dated December 1, 1868.

*To all whom it may concern:*

Be it known that MIRICK MORGAN, of Lancaster city, county of Lancaster, and State of Pennsylvania, did invent certain new and useful Improvements in Horse-Rakes for Raking Grain and Hay, of which the following is a full, clear, and exact description, reference being had to the accompanying drawing, making a part of this specification, in which—

Figure 1:
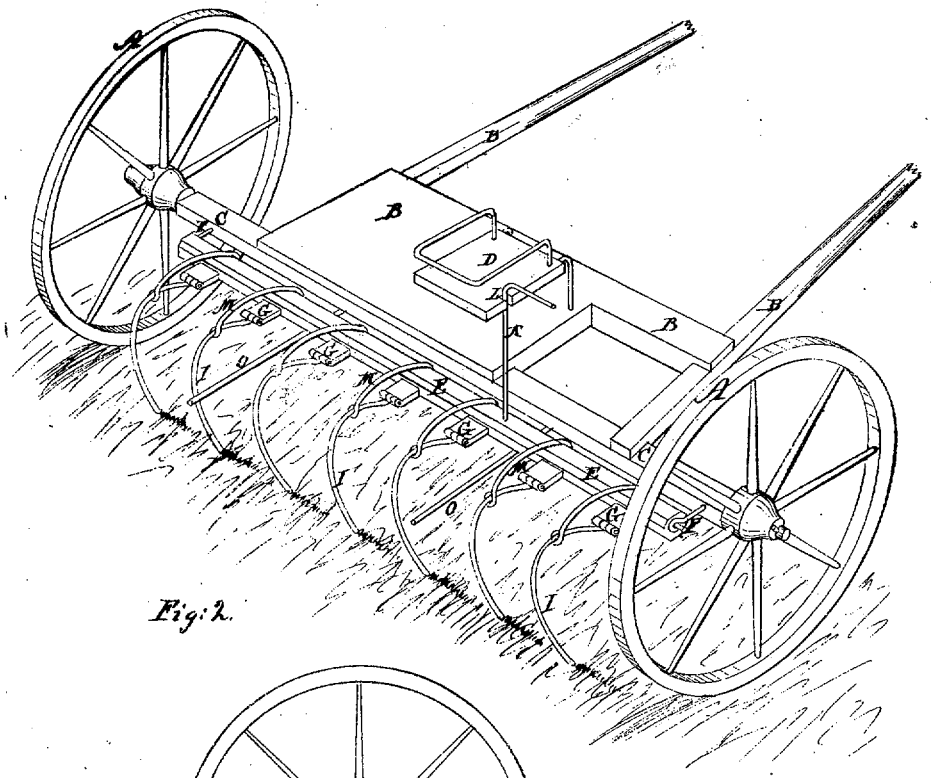
Figure 2:
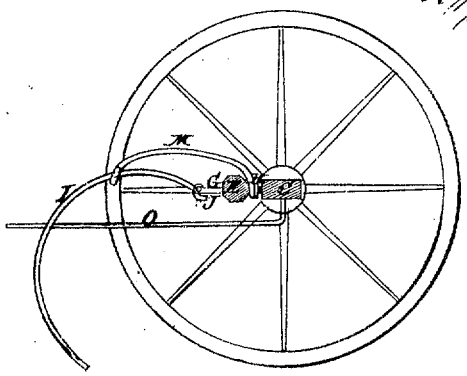

Figure 1 is a perspective view; and Fig. 2 is a vertical section of the main axle and rake-head, showing a side elevation of the rake and cleaner teeth, springs, &c.

Similar letters of reference denote corresponding parts in both figures.

The invention relates to a novel construction and arrangement of the parts of a horse hay-rake, and will be best understood from the following description, taken in connection with the drawings, in which—

A represents the carrying-wheels; B, the frame and shafts, resting upon the axle C, and rigidly connected thereto. D is the driver's seat, mounted on frame B; E, the rake head or roller, arranged in a line parallel with the stationary axle C, and mounted in bearings or eyes F attached thereto. G G are iron hinge-plates, fastened to the roller E by bolts and nuts H. I I are the wire rake-teeth, the upper ends, J, of which are bent around the pivots or bolt of the hinge-plates or boxes G, and are then extended underneath said hinge-plates, as shown in Fig. 2, in such manner as to stiffen the teeth, and to form a stop to prevent the teeth from falling downward when the rake-head is rotated for raising the same by the operation of the lever K. Said lever, by means of which the driver operates the rake to discharge the load, is fastened to the roller E, and while the rake is in motion rests in a groove or notch, L, for holding the teeth down to their work. M M are springs, one end of each of which is fastened to the forward ends of hinge-plates G or to roller E by the nuts H, which secures said plates to the rake-head, the other ends of said springs resting upon the teeth I, one for each tooth, and serving the purpose of keeping the teeth down to their proper position. The rake-teeth when raised for discharging their load are cleared by cleaners O, fastened to and projecting from the axle C. The said cleaners are made of wire, and are therefore elastic.

By inspection of the drawings it will be seen that the rake-head E is arranged in a line parallel with the stationary axle of the machine within the periphery of and between the two carrying-wheels A A, and the rake-teeth, separately hinged thereto, have a corresponding arrangement between said wheels, the line of the independent hinges being also parrallel with the axle and within the periphery of the wheels. By this arrangement the rake is brought into a compact form, and is best adapted to the work it is required to perform. Each tooth is connected with the rake-head by a single bolt, and can be readily removed and replaced when broken, or for transportation.

Having now described the invention, what is claimed as the invention of the said MIRICK MORGAN is—

1. In a two-wheeled wire-tooth hay-rake, having a stationary axle with teeth separately hinged, the combination of a spring to each tooth to assist in holding it to the ground, and attached to the rake-head by the same bolt which attaches the tooth at a point betwixt and within the periphery of the wheels, and a lever operated by the driver while riding on the seat, for raising and lowering the teeth.

2. In combination with a two-wheel wire-tooth hay-rake, the teeth of which are each separately and independently hinged against backward strain at a point betwixt and within the periphery of the wheels, a device operated by the attendant while riding on the seat for raising the teeth, and stationary cleaner-rods for holding the hay down in the upward movement of the teeth.

3. Hinging the teeth independently to cast-iron plates or heads, which are, in turn, connected to a common rocking head or shaft, operated by the attendant for raising the teeth while riding on the seat.

4. In combination with a two-wheel wire-tooth hay-rake, having a stationary axle with the teeth separately and independently hinged to a rake-head or support, which is hinged or pivoted betwixt and within the periphery of the wheels, a device operated by the attendant while riding on the seat for raising the teeth out of the gathered hay.

5. In a two-wheeled wire-tooth hay-rake, having a stationary axle, the combination of teeth hinged separately betwixt and within the periphery of the wheels, and a stop to each tooth to prevent it from falling below a certain point, and for holding it while being raised by the operator while riding on the seat.

6. The combination, in a two-wheeled wire-tooth hay-rake, with a stationary axle, of a support for the teeth, betwixt and within the periphery of the wheels, that will admit of an upward and downward motion to each tooth without the movement of the head that supports them against backward strain, and a stop for limiting its downward motion, and for enabling the attendant to raise the teeth from the ground by means of a device operated while riding on the seat.

7. Independently-hinged wire-teeth, each provided with a sustaining-spring applied thereto and united to the rake shaft or roller by a single screw-bolt, in such manner that each tooth can be taken off by removing a single bur that holds it in place.

8. In combination with a two-wheel wire-tooth hay-rake, the teeth being supported against their backward strain betwixt and within the periphery of the wheels, a device operated by the attendant while riding on his seat for locking the teeth to the ground, so as to prevent the teeth from rising over the accumulated hay while in operation, and a device for cleaning the teeth of the gathered hay in their upward motion.

9. In combination with a two-wheel wire-tooth hay-rake, with stationary axle having the teeth separately hinged to a rake-head betwixt and within the periphery of the wheels, a hand-lever attached to said head and operated by the attendant for raising the teeth while riding on the seat.

10. In combination with a two-wheel wire-tooth hay-rake, the teeth being supported against their backward strain betwixt and within the periphery of the wheels, a device operated by the attendant while riding on the seat for raising the teeth, with stationary cleaner-rods, supported at the inner end only, for holding the hay down while the teeth have their upward movement.

11. Supporting the stationary elastic wire cleaner-rods of a two-wheel wire-tooth hay-rake, betwixt and within the periphery of the wheels, for the purpose of holding the hay and straw down, with a device for raising the teeth, operated by the attendant while riding on the seat.

ADAM R. REESE.

Witnesses:
THOMAS I. HUBBELL,
JOHN LESHER.